Patented Aug. 29, 1950

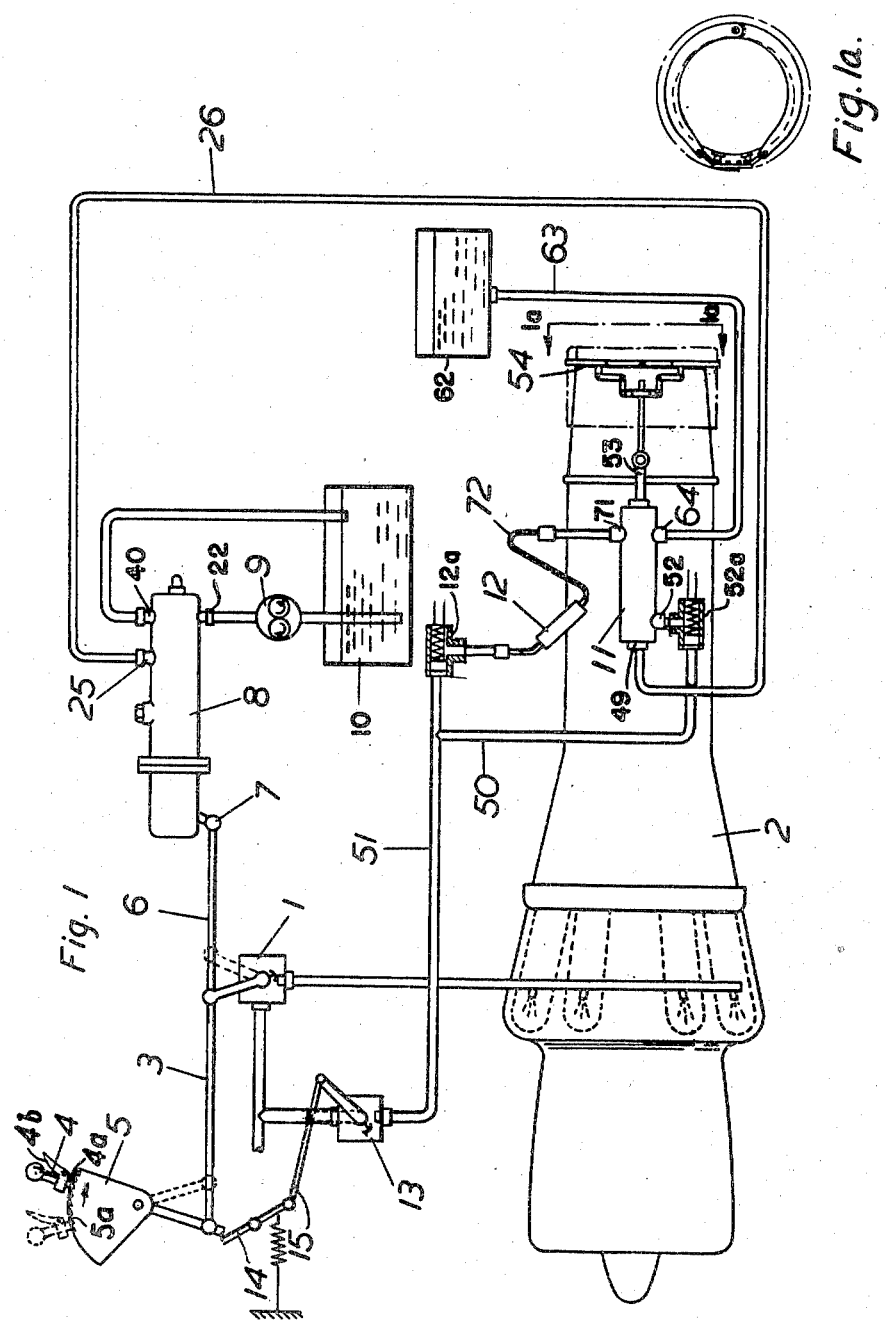

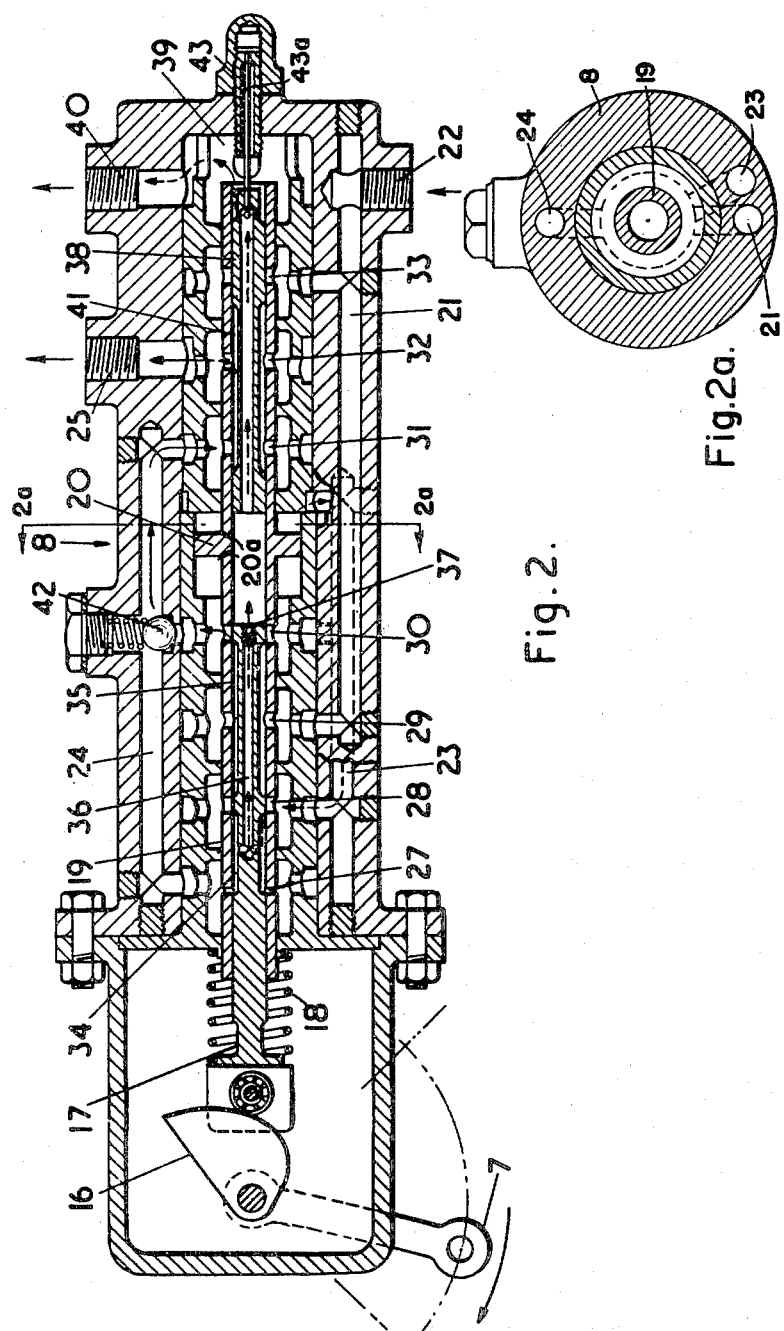

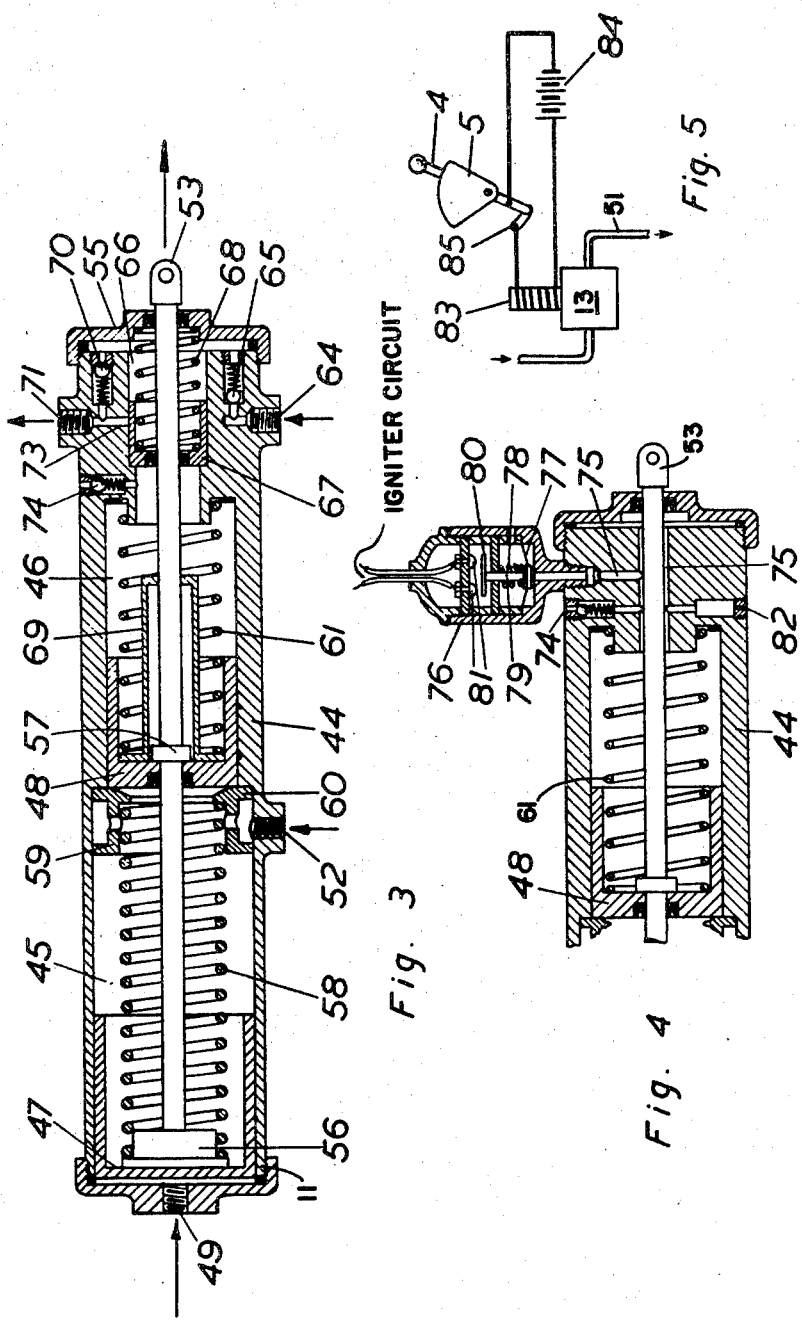

2,520,434

UNITED STATES PATENT OFFICE 2,520,434

CONTROL SYSTEM FOR TURBOJET ENGINES WITH REHEAT FUEL SUPPLY SYSTEM

Arthur Rynyon Devereux Robson, Peterborough, England, assignor to Power Jets (Research and Development) Limited, London, England, a British company Application March 18, 1947, Serial No. 735,498
In Great Britain March 15, 1946

6 Claims. (Cl. 60—35.6)

In order to obtain the best performance and optimum efficiency of operation of a simple gas-turbine jet-propulsion power plant for aircraft in all circumstances met with, the area of the propelling nozzle should be varied in accordance with the conditions of operation. Thus the optimum nozzle area depends among other things on the altitude of operation and the forward speed.

This invention, however, is concerned with other considerations, which affect the optimum nozzle area or/and configuration and these considerations are in part at least applicable to jet propulsion power plants other than the simple gas-turbine type, for example such as include a piston-type engine driving the main compressor.

Broadly stated, the object of the invention is an automatic regulation of the nozzle area or/and jet characteristics in accordance with the requirements of the operating conditions of the power plant (when installed in an aircraft) other than altitude and forward speed. The particular conditions with which the invention is concerned are:

(1) Idling,
(2) Starting and accelerating,
(3) Decelerating.

The requirements for each of these conditions are:

(1) When idling, the thrust generated should be kept as small as possible (or even become negative) to facilitate landing and to improve the deceleration characteristics of the aircraft in flight;

(2) To facilitate starting and rapid acceleration of the power plant, the back pressure on the exhaust system should be minimized to reduce the load on the compressor and avert stalling of the compressor elements, and also to prevent excessive increase of the jet pipe temperature;

(3) No such requirement exists when reducing speed or power, so that in this operation no variation of the nozzle area or jet characteristics is called for until the idling condition is attained.

Moreover, the reduction of back pressure during acceleration only calls for temporary variation of nozzle area while acceleration is taking place.

It will be evident that the first requirement applies equally to any form of jet propulsion power plant whatever; the second is likewise of general application but is of considerably greater importance in gas-turbine power plants and especially in the simple type in which the whole of the compressor delivery is passed through the combustion chambers and turbine system.

Broadly this invention consists in inter-connecting the means controlling a mechanism for varying the area of the jet nozzle or/and for varying the jet characteristics with the power control of the power plant, commonly and loosely referred to as the "throttle," in such a way that (1) Thrust is minimized when idling,
(2) Back pressure in the jet pipe is temporarily reduced during movements of the power control to increase power and reverts to normal value when movement of the power control ceases, and
(3) Movements of the power control to decrease power outside the idling range are without effect on the jet nozzle.

A further development of the invention is concerned with the application of re-heat to the working fluid after energy has been extracted from it by expansion through a turbine. Since re-heating, though affording increased jet thrust, is usually extravagant in fuel consumption, it is commonly applied as a power-boosting expedient for emergency use only and in normal operation the re-heat is shut off. When the re-heat is turned on an increase of nozzle area is called for and it has already been proposed to provide an inter-connection between the re-heat control and the means controlling a mechanism for varying the nozzle area to effect this adjustment automatically.

A feature of the present invention consists in combining such a control inter-connection with the throttle-interconnected nozzle control previously herein mentioned, the arrangement being such that each of the controls concerned, viz. the throttle and the re-heat control, can exert their appropriate effects on the nozzle control independently.

Alternatively, the independent re-heat control may be replaced or supplemented by an interconnection with the throttle so operative that reheat is automatically applied at the highest power settings of the throttle and turned-off at cruising and lower throttle settings, appropriate adjustment of the nozzle area being at the same time automatically effected.

The mechanism employed for varying the nozzle area or/and jet characteristics may be of any convenient type of variable area nozzle such as the caliper type. It is essential during starting and acceleration for the back pressure in the jet pipe to be reduced since a mere reduction of thrust is of no advantage. Thus, a pure thrust spoiler which only acts by obstructing the free flow from the jet pipe is undesirable. Any variable area nozzle employed must be capable of giving a decrease in back pressure in the jet pipe when in the fully open position.

A preferred arrangement according to the invention includes a variable area jet nozzle, power means for operating it (which may use any convenient kind of power, such as hydraulic, pneumatic or electrical), and a remote control system comprising an element moved by the "throttle" lever controlling the power of the power plant, a follow-up element, means tending to keep the follow-up element in step with the throttle-actuated element, means operative to energize the power means for increasing the nozzle area when the throttle-actuated and follow-up elements are out of step, and means resisting movement of the follow-up element in the direction corresponding to a throttle movement for increasing the power of the power plant, but imposing no appreciable resistance to movement in the opposite direction.

The remote control system also preferably includes a fixed element co-operative with the follow-up element to effect energization of the power means to increase the nozzle area, when the follow-up element, being in step with the throttle-actuated element, reaches a position corresponding to the idling range of the throttle lever.

If the area of the nozzle is to be automatically varied in accordance with the requirements of re-heat, the preferred arrangement is further characterised by the inclusion in the receiving end of the remote control system of an element selectively movable, either by a receiver element of the remote control system controlled by the throttle lever or by a receiver element of a second remote control system controlled by the re-heat fuel cock, to effect an increase of nozzle area, the said selectively movable element being preferably provided with spring return means.

The receiver element responsive to the re-heat fuel cock may conveniently be a hydraulic piston operated by the pressure of the fuel in the re-heat supply line, which thus constitutes the transmission line of the second mentioned remote control system, the re-heat fuel cock constituting the transmitter thereof.

The hydraulic piston constituting the receiver element mentioned above may also actuate means for igniting the fuel at the re-heat burner. In one preferred arrangement, the piston or an extension thereof, picks up the plunger of a pump delivering a metered quantity of "igniter" fuel or fluid supplied from a separate source. The pump plunger may have spring return means and its delivery and suction lines may be provided with non-return valves. Preferably the hydraulic piston operated by the fuel pressure also functions as a pneumatic piston which compresses air in front of it before picking up the pump plunger; the air thus compressed serves to blow the measured quantity of igniter fuel or fluid into the burner and clear the pump delivery line when a transfer port is uncovered by the pump plunger at the end of its stroke, the air space in front of the hydraulic-pneumatic piston being refilled on the return stroke through an atmospheric non-return valve. Suitable igniter fuels or fluids such as a gas or volatile liquid or colloidal magnesium or tertiary butyl peroxide or a mixture of a lubricating oil with 0.05 to 0.1% of stearic acid and with 5% amyl nitrite are mentioned in the specification of co-pending United States patent application Serial No. 642,920, filed January 23, 1946.

In an alternative arrangement, electrical ignition is employed; as before the hydraulic piston operated by the fuel pressure functions as a pneumatic piston compressing air in front of it which is fed to the under-side of a spring loaded diaphragm carrying the movable contact of an igniting circuit switch. A controlled leak from the pneumatic system allows the diaphragm to be returned by its spring to the open-circuit position after an appropriate delay, and as before the air space is refilled on the return stroke of the hydraulic-pneumatic piston through an atmospheric non-return valve.

To bring the re-heat into action automatically at "emergency maximum power," the re-heat cock control lever may be combined in the throttle lever assembly, so as to be picked up by the latter and moved to the "on" position when the throttle lever reaches the "emergency" maximum power setting, and returned to the "off" position when the throttle lever is returned to the "normal" maximum power setting. Or to ensure quick and positive operation of the re-heat fuel cock it may be operated by a solenoid controlled by a tumbler switch so placed in the throttle gate that when the throttle lever passes from the normal maximum power to the emergency maximum power setting and conversely, the tumbler switch is thrown over in the appropriate direction.

Some details of a typical embodiment of the invention and a modification thereof are illustrated by way of example in the accompanying drawings, in which Fig. 1 is a general diagrammatic view of a gas turbine jet propulsion engine with the control installation according to the invention, Fig. 1a shows an end view of jet with variable jet nozzle as seen from line 1a—1a in Fig. 1, Fig. 2 is a sectional view of the transmitter of a remote control system for operating a variable jet nozzle, Fig. 2a is a cross section of the transmitter in Figure 2 on the line 2a—2a, Fig. 3 and Fig. 4 are sectional views of alternative forms of the receiver, Fig. 4 being only a partial view and Fig. 5 is a diagrammatic view of an alternative electrically controlled reheat fuel cock.

Referring now to Fig. 1 the main fuel supply valve 1 for a gas turbine jet propulsion engine 2 is operated through a link 3 by a throttle lever 4 moving in a gate 5 having notches 5a for the engagement of a catch 4a actuated by a lever 4b in the usual manner. The throttle lever is connected by a link 6 with the operating lever 7 of a hydraulic remote control transmitter 8 supplied with hydraulic fluid under pressure by a pump 9 from a tank 10. The lever 4 is shown in the full throttle position. The arrow indicates the direction for the throttle opening movement of the lever 4.

The transmitter 8 controls the operation of a receiver 11 having a hydraulic ram for operating means for varying the jet characteristics as by variation of the nozzle area and means for initiating the ignition of reheat fuel at reheat burners 12.

The means for varying the jet characteristics may comprise a variable area nozzle of the kind described in co-pending United States application Serial No. 630,949, filed November 26, 1945.

The reheat fuel is supplied to the burners 12 through the reheat fuel valve 13 which is operated by the throttle lever 4 either directly as shown diagrammatically in Fig. 1 through lever 14 and link 15 or electrically as shown in Fig. 5 the arrangement in either case being such that the reheat fuel supply is only turned on when the throttle lever is moved beyond its normal maximum power setting towards the emergency maximum power setting and lever 4 contacts lever 14 and moves it to open valve 13.

In order that the operation of the control installation may be more clearly understood reference will now be made to Fig. 2 which shows the transmitter 8 in sectional elevation. The operating lever 7 of the transmitter is pivotally supported in the casing of the transmitter and carries a cam 16 which displaces a pilot piston 17 having a return spring 18 and sliding in a ported follow-up sleeve 19 carrying a piston 20 which slides in an enlargement of the bore of the casing. The bore of the casing also comprises a number of annular chambers surrounding the follow-up sleeve and communicating with a gallery 21 connected to an inlet 22 through which the operating fluid is admitted under pressure, with transfer galleries 23 and 24, and with a delivery connection 25 communicating with the transmission line 26 (Fig. 1) of the remote control system, all in the manner shown. The follow-up sleeve 19 is provided with ports 27, 28, 29, 30, 31, 32 and 33 and the piston 17 has lands defining two annular clearances 34, 35 within the follow-up sleeve, of which clearances one (34) communicates as shown with a central bore 36 in the piston 17 terminating in a fine bleed hole 37. Within the right hand end of the follow-up sleeve 19 is a fixed tubular distributor piston 38, whose right hand end is open to a space 39 at the end of the casing in communication with a drain connection 40, and which has two lands defining an annular clearance 41 within the follow-up sleeve communicating through port 32 with the delivery connection 25.

The pressure connection 22 communicates through gallery 21 and port 29 with the annular clearance 35 defined by the lands of the piston 17, and in the normal position, as shown in Fig. 2, these lands close both ports 28 and 30, thus shutting off pressure from the system.

On "opening" the throttle 4 the lever 7 moves in the direction of the arrow (Fig. 2) and cam 16 moves piston 17 left to right admitting pressure fluid through port 30 and a non-return valve 42 to gallery 24, whence it passes through ports 31 and 32 to the delivery connection 25 thus energizing the transmission line 26. The pressure fluid, admitted through port 30 also acts on the left hand face of piston 20 and causes the follow-up sleeve 19 to move to the right but as the space at the right hand side of piston 20, which communicates through gallery 23 (see Figure 2a) and port 28 with the annular clearance 34 between the sleeve 19 and piston 17, can only be drained through the interior of piston 17 and the bleed 37, port 27 being closed by the displacement of piston 17, the movement of the follow-up sleeve 19 is necessarily delayed and it is unable to catch up the piston 17 in its displacement. Therefore as long as piston 17 is actually being moved by the throttle lever (in the opening direction) pressure is applied to the transmission line and the receiver unit 11 (Fig. 1) is energized to increase the nozzle area.

However when the displacement of the throttle lever is completed the pressure applied to the follow-up sleeve piston 20 continues to move it until the follow-up sleeve 19 regains its original position relatively to the piston 17, when pressure is again cut-off entirely and the nozzle area is decreased to its normal value by a spring return, the excess fluid in the receiver unit 11, and transmission line 26 being drained through connection 25, ports 32 and 31, gallery 24, port 27 and bleed 37, which ensures a "cushioned" return of the nozzle mechanism to its normal position.

On the return movement of the throttle lever 4, piston 17 is displaced relatively to the follow-up sleeve 19 in the opposite direction, and pressure fluid is admitted through ports 28, 29 and gallery 23, to the right hand face of piston 20 thus causing the follow-up sleeve to follow the piston 17. Since the space at the left hand side of piston 20 can now drain freely through port 30 there is no delay in the follow-up movement. Moreover, since gallery 24 is no longer in communication with the pressure supply gallery 21, no pressure is applied to the transmission line 26 and no action takes place at the receiving end. Bleed holes 20a connect the spaces on either side of piston 20 to the interior of the follow up sleeve 19.

When the idling range of the throttle is reached the distributor piston 38 comes into operation, the displacement relatively thereto of the follow-up sleeve 19 causing the port 31 to be closed and port 32 to be put in communication with port 33 which is in direct communication with the pressure gallery 21. Pressure therefore is applied to the transmission line 26 through ports 33, 32 and connection 25 and the nozzle area is increased by the action of the pressure in the receiver unit 11. This application of pressure to the receiver unit continues as long as the throttle lever is within its idling range. The distributor piston 38 is attached by a rod 43a to an adjusting screw 43 which allows the limit of the idling range at which the increase of nozzle area occurs to be adjusted.

The receiver unit 11 shown in Fig. 3 comprises a casing 44 the interior of which constitutes two cylinders 45, 46 in tandem containing sliding pistons 47 and 48 respectively. The transmission line 26 from the transmitter unit 8 is connected at 49 and a branch 50 from the re-heat fuel line 51 (downstream of the re-heat fuel cock 13, Fig. 1) is connected at 52. An operating rod 53 connected to the variable area nozzle 54 (Fig. 1 and Fig. 1a) slides in the cylinders, being supported in the piston 48 through which it passes and in a cap 55 closing the end of the casing 44. The rod 53 is provided with a head 56 which is engaged by the inner face of piston 47 and a collar 57 engaged by the inner face of piston 48. A return spring 58 bears on the underside of head 56 and its abutment is provided by a collar 59 engaging a shoulder 60 on the inside of the casing. The collar 59 also forms a return stop for the piston 48 which is provided with a separate return spring 61. It will therefore be seen that movement of either piston from left to right will carry with it the rod 53 without transmitting any motion to the other piston; this movement of rod 53 effects an increase of nozzle area.

Piston 47 is so moved when the transmission line 26 connected at 49 is put under pressure by the transmitter unit, working fluid being then delivered into the cylinder space to the left of piston 47. Similarly, when the re-heat fuel valve is set to the "on" position, the pressure of the re-heat fuel supply is applied to the left hand face of piston 48 to move it from left to right. A dump valve 12a is arranged in the line 51 and another dump valve 52a is arranged in the line 50. The dump valves 12a and 52a open under the pressure of the fuel from the valve 13 and pass fuel to the burners 12 and to the receiver unit 11. When valve 13 is closed, the pressure in the lines 50—51 drops and the dump valves 12a and 52a close and cut off the fuel supply and open the burners 12 and the space between pistons 47 and 48 to drain.

Ignition of the fuel issuing at the re-heat burners 12 (Fig. 1) is effected by means of a special igniter fluid. This is supplied from a tank 62 (Fig. 1) through a pipe 63 (Fig. 1), an inlet connection 64 (Fig. 3) and a non-return valve 65 to a small pump chamber 66 in the end of the casing in which slides a metering pump plunger 67 provided with a return spring 68. When the piston 48 moves from left to right under the pressure of the re-heat fuel, an extension 69 of this piston picks up the plunger 67 and moves it from left to right to deliver a quantity of igniter fluid, measured by the stroke of plunger 67, through a non-return valve 70 and a delivery connection 71 to a delivery line 72 (Fig. 1) terminating at the re-heat burner 12 (Fig. 1). At the same time air is compressed between piston 48 and plunger 67 and when the latter has reached or nearly reached the end of its stroke it uncovers a transfer port 73 through which the compressed air escapes to the delivery connection 71 and into the delivery line 72, thus clearing the latter and blowing the quantity of igniter fluid measured and delivered by the pump plunger, into the combustion region of the burners 12 where it promptly ignites and fires the fuel issuing at the burners.

The return stroke of the plunger 67 effected by spring 68 draws a fresh charge of igniter fluid from the supply tank 62 into the pump chamber; and on the return stroke of piston 48 the air space between it and the pump plunger is re-filled with air through an atmospheric non-return valve 74.

Alternatively, the re-heat fuel may be ignited by electrical means as shown in Fig. 4. In this arrangement the right hand end of the casing 44 is closed but a passage 75 connects the air space to the right of piston 48 with a chamber 76 containing a diaphragm 77 loaded by a spring 78 and having a stem 79 carrying a contact 80, which bridges the contacts 81 of an igniter circuit (not shown) when the diaphragm is raised against the effort of spring 78 by the pressure beneath it of air compressed by the movement of piston 48 from left to right. A bleed hole 82 affords a controlled leak, which, after an appropriate delay, relieves the air pressure sufficiently to allow the spring 78 to return the diaphragm 77 and contact 80 to the open-circuit position. As in Fig. 3 an atmospheric non-return valve 74 allows the air space to the right of piston 48 to be re-charged on the return stroke of that piston.

The reheat fuel valve 13 instead of being operated mechanically as shown in Fig. 1 may be electrically actuated as by means of a solenoid 83 (Fig. 5). In this case the throttle lever 4 carries a contact connected to one pole of source of current, for example battery 84, adapted to make contact with a contact strip 85 connected to one end of the solenoid winding. The other end of the winding is connected to the other pole of the battery 84. The contact strip 85 is so disposed relatively to the gate 5 that the solenoid circuit is only made when the throttle lever is moved beyond the normal maximum power setting.

I claim:

1. A gas turbine jet propulsion engine for aircraft comprising a turbine providing propelling power, compressor means including a compressor driven by said turbine and always operating therewith to compress air for use in the motive fluid delivered to said turbine, combustion chamber means to which the compressed air is supplied and from which motive fluid is delivered to said turbine, fuel supplying system for supplying fuel to said combustion chamber means to produce said motive fluid, jet pipe means for directing the exhaust motive fluid from said turbine away from said engine at high velocity to provide jet propulsion, variable area jet nozzle means in said jet pipe, re-heat fuel supply system and burners for supplying heat to the exhaust motive fluid in said jet pipe, an engine throttle control controlling the fuel to the combustion chamber means and control means interconnecting said throttle and said variable area jet nozzle means for operating said variable area jet nozzle means at low power throttle settings and interconnecting said throttle, variable area jet nozzle means and said reheat supply system and burners for operating said variable area jet nozzle means and controlling said re-heat burners at the highest power throttle setting.

2. A gas turbine jet propulsion engine for aircraft comprising a turbine providing propelling power, a compressor driven by said turbine and always operating therewith to compress air for use in the motive fluid delivered to said turbine, combustion chambers to which compressed air is supplied and from which motive fluid is delivered to said turbine, a fuel supplying system for supplying fuel to said combustion chambers to produce motive fluid, a jet pipe for directing the exhaust motive fluid from said turbine away from said engine at high velocity to provide jet propulsion, a variable area jet nozzle in the jet pipe, a re-heat fuel supply system and burners for supplying heat to the exhaust motive fluid in said jet pipe, an engine throttle control controlling the fuel to the combustion chambers and a remote control system including a receiver and power unit for operating said variable area jet nozzle and a transmitting unit including a pilot element moved by said throttle, a follow-up element and a distributor element cooperating together to effect energization of the power unit only during movement of the throttle in the low power throttle setting region and a second power unit for operating said variable jet nozzle and a second transmitting unit including an element moved by the throttle to effect energization of the second power unit and control said re-heat burners only at the highest power throttle setting.

3. A gas turbine jet propulsion engine for aircraft comprising a turbine providing propelling power, a compressor driven by said turbine and always operating therewith to compress air for use in the motive fluid delivered to said turbine, combustion chambers to which compressed air is supplied and from which motive fluid is delivered to said turbine, a fuel supplying system for supplying fuel to said combustion chambers to produce motive fluid, a jet pipe for directing the exhaust motive fluid from said turbine away from said engine at high velocity to provide jet propulsion, a variable area jet nozzle in the jet pipe, a re-heat fuel supply system and burners for supplying heat to the exhaust motive fluid in said jet pipe, an engine throttle control controlling the fuel to the combustion chambers and a remote control hydraulic fluid system including a receiver and a power cylinder with a piston for operating said variable area nozzle and a transmitter unit including a pilot piston adapted to be moved by said throttle in the throttle opening direction only and returned by a spring, a ported follow-up sleeve with piston for moving it and a fixed distributor piston, said pilot and distributor pistons being arranged at opposite ends within said follow-up sleeve, the three cooperating together to pass hydraulic fluid to said power cylinder only during movement of said throttle in the throttle opening direction in the low power throttle setting region and a second transmitting unit comprising a valve in said hydraulic system opened by said throttle to pass fluid to said power cylinder and fuel to said burners only during the highest power throttle setting.

4. A gas turbine jet propulsion engine for aircraft comprising a turbine providing propelling power, a compressor driven by said turbine and always operating therewith to compress air for use in the motive fluid delivered to said turbine, combustion chambers to which compressed air is supplied and from which motive fluid is delivered to said turbine, a fuel supplying system for supplying fuel to said combustion chambers to produce motive fluid, a jet pipe for directing the exhaust motive fluid from said turbine away from said engine at high velocity to provide jet propulsion, a variable area jet nozzle in the jet pipe, a re-heat fuel supply system and burners for supplying heat to the exhaust motive fluid in said jet pipe, an engine throttle control controlling the fuel to the combustion chambers and a remote control hydraulic fuel system including a receiver and power cylinder with two pistons either of which operates said variable area jet nozzle and a transmitting unit including a pilot piston adapted to be moved by said throttle in the throttle opening direction only and returned by a spring, a ported follow-up sleeve with piston for moving it and a fixed distributor piston, said pilot and said distributor pistons being arranged in opposite ends within said ported follow-up sleeve, the three cooperating together to pass fuel to one of said pistons in said power cylinder to operate said variable jet nozzle only during movement of said throttle in the throttle opening direction in the low power throttle setting region and a valve in said reheat fuel system adapted to be opened by said throttle to control the supply of fuel to said re-heat burners and the supply of fuel to the other of said pistons in said power cylinder to operate said variable area jet nozzle only during the highest power throttle setting.

5. A gas turbine jet propulsion engine for aircraft as claimed in claim 4 including a priming pump in said receiver and power cylinder and a separate fuel system connecting said pump to said re-heat burners, said priming pump being operated by said piston of said power cylinder that operates the variable area jet nozzle at the highest power throttle setting.

6. A gas turbine jet propulsion engine for aircraft as claimed in claim 4 including a re-heat ignition switch pneumatically operated by said piston of said power cylinder that operates the variable area jet nozzle at the highest power throttle setting.

ARTHUR RYNYON DEVEREUX ROBSON.

REFERENCES CITED

The following references are of record in the file of this patent:

UNITED STATES PATENTS

| Number | Name | Date |
|---|---|---|
| 2,280,835 | Lysholm | Apr. 28, 1942 |